United States Patent [19]

Hyppanen

[11] Patent Number: 5,332,553
[45] Date of Patent: Jul. 26, 1994

[54] METHOD FOR CIRCULATING SOLID MATERIAL IN A FLUIDIZED BED REACTOR

[75] Inventor: Timo Hyppanen, Karhula, Finland

[73] Assignee: A. Ahlstrom Corporation, Noormarkku, Finland

[21] Appl. No.: 41,571

[22] Filed: Apr. 5, 1993

[51] Int. Cl.$^5$ .................. F27B 15/08; B01J 8/18; F26B 17/00
[52] U.S. Cl. .................. 422/147; 422/141; 422/142; 422/143; 422/145; 422/146; 422/241; 122/4 D; 34/589; 34/578; 110/245
[58] Field of Search .............. 422/141, 241, 142, 146, 422/145, 143, 147, 144; 122/4 D; 34/57 A; 110/245; 431/7, 170; 165/104.16

[56] References Cited
U.S. PATENT DOCUMENTS

3,859,963  1/1975  Roberts et al. ............... 122/4 D
3,893,426  7/1975  Bryers ........................ 122/4 D
4,333,909  6/1982  Stewart et al. ............... 422/141
4,690,802  9/1987  Jenkinson ................. 422/144 X
5,034,197  7/1991  Potinkara ................. 422/241 X
5,060,599  10/1991  Chambert ................... 122/4 D Primary Examiner—Robert J. Warden
Assistant Examiner—Christopher Y. Kim
Attorney, Agent, or Firm—Nixon & Vanderhye

[57] ABSTRACT

In a fluidized bed reactor particles are internally circulated, moving down the walls forming the reactor chamber. A particle chamber having a particle gathering top wall with a horizontal projection area A is disposed in the downward flow of particles. Openings (e.g. holes or slots) with a controlling dimension of about 30 mm or less are provided in the top wall, the openings having total open area B less than half the area A. Heat transfer surfaces may be disposed in the particle chamber.

10 Claims, 7 Drawing Sheets

METHOD FOR CIRCULATING SOLID MATERIAL IN A FLUIDIZED BED REACTOR

BACKGROUND AND SUMMARY OF THE INVENTION

The present invention refers to a method and an apparatus for circulating solid material in a fluidized bed reactor, including a reactor chamber, having side walls defining the interior of the reactor chamber and a grid at the bottom of the reactor chamber; a gas discharge opening adjacent the upper end of the reactor chamber and a fluidized bed of solid particles in said reactor chamber, the fluidized bed having an internal circulation of solid particles.

In fluidized bed reactors, both conventional bubbling bed reactors and circulating bed reactors, there is an internal circulation of solid bed material within the reactor chamber. The bed material is in a continuous upwards and downwards motion. The finer the solid particles the more easily they flow upwards in the reactor chamber. A fractionation of solids therefore takes place in the reactor chamber. A dense solid particle fraction, including larger objects, is formed in the lower part of the reactor chamber, whereas less dense solid particle fractions, including fine particles, are formed higher up in the reactor chamber.

It may in some processes be desirable to gather a portion of the particles forming the bed material for separate processing, e.g. cooling or classification, at a different location, before further processing that portion of particles in the main reactor chamber. It is known to discharge solid particles from a reactor chamber and after processing, e.g. after cooling, recirculating the particles back into the reactor chamber.

It is however often desirable to be able to process particles within the reactor chamber without having to discharge the particles and recirculate them externally through a particle separator and an external processing chamber. Especially if large amounts of particles are to be processed it would be preferable to process the particles within the reactor chamber itself without external circulation.

It would e.g. be desirable to take advantage of the large amount of solid particles circulating internally in the lower part of a fluidized bed reactor chamber. It would in many processes also be advantageous to process mainly particles of a certain size. Particles of a size suitable for e.g. neat recovery are however often, due to fractionation in the lower part of a reactor chamber, mixed with big particles or with large objects, which tend to prevent optimal heat recovery. Large objects tend e.g. to clog the heat transfer surfaces and cause mechanical damage.

It is desirable to gather into a defined space, such as a particle chamber used as an internal heat exchanger, enough particles having a certain size, suitable for a particular purpose to efficiently accomplish that purpose, e.g. heat recovery. The inlet openings guiding particles into the internal heat exchanger may be too small to allow enough particles to flow into the chamber. Or the inlets of the particle chamber may be positioned at a location having decreased internal circulation. There may therefore be a need to concentrate the particle flow into the particle chamber.

It is therefore an object of the present invention to provide an improved method and an improved apparatus for gathering solid particles from within the internal circulation of solid particles in a fluidized bed reactor, for separate processing of the solid particles within the fluidized bed reactor.

It is especially an object of the present invention to provide an improved method and apparatus for recovering heat from solid particles within the internal circulation of solid particles in a fluidized bed reactor chamber.

According to the invention, a method for circulating solid material in a fluidized bed reactor, having an internal circulation of solid particles, is practiced by the following steps: (a) Gathering solid particles from the internal circulation of solid particles into a particle chamber, having an upper gathering wall with inlet openings allowing particles to flow into the particle chamber. (b) Disposing the gathering wall within the internal circulation of solid particles to meet a flow of particles having a horizontal cross sectional area A. (c) Causing particles to flow into the particle chamber through inlet openings having a total open area B, significantly smaller than the cross sectional area A. And, (d) recirculating at least a portion of the particles from the particle chamber into the reactor chamber.

According to a preferred embodiment of the invention, the cross sectional area A is more than twice as large as the total open area B of the inlet openings. A large upper gathering wall may be used for gathering particles from a large cross sectional area of the reactor chamber. The gathering wall may be primarily formed of an upper end wall of the particle chamber, the end wall having an area A having the size and form of the cross section of the particle chamber.

The gathering wall may, however, in other embodiments of the present invention be formed of an upper end wall having extensions which guide particles toward the upper end wall, in which case the gathering wall collects particles from an extended particle flow.

The particles gathered by the gathering wall may be concentrated by allowing the particles to flow only through inlet openings arranged on or covering restricted areas of the upper end wall. This leads to an increased density of the particle flow flowing through the inlet openings into the particle chamber. By positioning of the inlet openings it is possible to lead the particle flows into pre-determined locations of the particle chamber, it is e.g. possible to concentrate particles into certain heat transfer sections of the particle chamber.

The inlet openings may also be used to classify particles allowed to flow into the particle chamber. Thereby the inlet openings may allow only particles of a size smaller than a predetermined size to flow from the fluidized bed through the end wall into the particle chamber. The end wall thereby forms a barrier wall between the reactor chamber and the particle chamber. Large objects, having a size bigger than said predetermined size of particles, will then be guided downwardly in the reactor chamber externally of the particle chamber.

Also according to the invention, an apparatus for classifying solid particles in a fluidized bed reactor having an internal circulation of particles is provided. The apparatus comprises: A particle chamber disposed in the fluidized bed of solid particles. The particle chamber having an upper gathering wall, with a horizontal projection area A. Inlet openings, such as holes or slots, disposed in the upper gathering wall, for allowing particles in the fluidized bed to flow into the particle chamber, the inlet openings having a total open area B, which is less than half of the area A. And, the particle chamber further having a wall provided with at least one opening for recirculating particles from the particle chamber into the reactor chamber.

Heat transfer surfaces are according to a preferred embodiment of the invention arranged in the particle chamber. Heat is then easily and efficiently recovered from particles, without large objects adversely affecting heat recovery.

The particle chamber may be disposed adjacent to a side wall or a partition wall in the lower part of the reactor chamber for gathering and if desired classifying solid particles flowing downwardly by gravity along the walls. Then the uppermost end or roof construction of the particle chamber forms the gathering wall or end wall. The upper gathering wall may be horizontal or inclined.

The upper end wall of a particle chamber may constitute a barrier wall and have openings allowing only particles of a size smaller than a predetermined size to flow therethrough, preventing large objects from flowing into the particle chamber. By making the upper end wall inclined e.g. about 30°-45° from horizontal large objects are caused to continue to flow downwardly along the external side of the end wall without clogging the openings in the end wall.

The present invention may be used e.g. in fluidized bed combustors, where one or several particle chambers are arranged on the bottom of the combustion chamber. The particle chamber or chambers may be adjacent the side walls or partition walls in the combustion chamber or may even stand freely on the bottom. In some embodiments particle chambers may be arranged as protrusions higher up in the combustion chamber.

In hot surroundings the particle chamber may be constructed of water tube panels, like the reactor chamber itself. The tube panels may be refractory lined. The openings in the upper end wall may then be made in fins combining adjacent water tubes or may be made by bending a water tube or two adjacent water tubes to provide a slot between the tubes. If the upper end wall is refractory lined then a furrow may be formed in the refractory lining and the openings may be made in the bottom plane of the furrow. There may be only one opening or slot in the upper end wall if the amount of particles introduced through this opening is sufficient. Usually several openings or slots are provided in the upper end wall to provide a sufficient flow of particles. Slots or rows of openings disposed in horizontal or inclined walls on top of the particle chamber may advantageously be disposed perpendicularly to the reactor side wall.

There may be long particle chambers covering substantially the whole length of a side wall or several side walls, or there may only be one small particle chamber, or two small particle chambers spaced apart from each other at a side wall.

The particle chamber may e.g. reach to a level 3 to 8 meters above the grid of a circulating fluidized bed reactor, whereby a rather large downward flow of particles may be gathered by the upper end wall of the particle chamber. In some processes a small particle chamber would be able to process more particles than what can be gathered by its upper end wall. In these processes an extension surface may be connected to the upper end wall. The extension surface should be arranged so that it guides particles from adjacent areas towards the upper end wall.

The inlet openings in the upper end wall may in circulating fluidized bed combustors be holes, having a diameter about 50 mm, preferably about 30 mm or smaller, or slots having a width about 50 mm, preferably about 30 mm or smaller. Such openings allow only approximately round particles of a size <50 mm or oblong particles having a width <50 mm to flow through the upper end or barrier wall.

In fluidized bed combustors the particle chamber may be used for heat recovery. Evaporators, superheaters or other heat exchange/transfer surfaces are disposed in the particle chamber. The invention provides the option to run combustors at low load, even when it is impossible to get enough heating capacity in the upper regions of the combustor chamber or in external heat exchangers connected through particle separators to the external recirculation loop. The invention makes it possible to obtain a balance between superheating and evaporation for different loads or for different fuels. The invention also makes it possible to achieve higher steam temperatures when burning fuels releasing corrosive gases if the superheaters are disposed in a particle chamber having a less corrosive gas atmosphere than the reactor chamber, or non-corrosive gas atmosphere.

Heat transfer surfaces may be disposed in any conventional manner in the particle chamber. Heat transfer may be controlled by introducing fluidizing air/gas into the fine material chamber. The fluidizing air may be used as secondary air in the combustion chamber.

Good mixing of solid material in the particle chamber is important if heat is to be recovered from the particles in the particle chamber. Mixing can be optimized by providing the inlet or inlets of and outlet or outlets for solid particles in opposite ends of the particle chamber.

Particles may be recirculated from the particle chamber into the reactor chamber by overflow openings. These openings may be provided on only one side wall of the particle chamber, or there may be openings provided on several side walls. It is in most cases advantageous to dispose the overflow openings far away from the inlet openings (which are in the upper end wall) if good mixing of particles in the particle chamber is desired.

The particles may alternatively be recirculated through a gas lock, such as narrow slot like openings disposed one above the other in a side wall of the particle chamber. The particles may also be recirculated through a gas lock of a L-valve type formed between the particle chamber and the reactor chamber. The recirculation may be controlled by fluidizing the fine particles in the vicinity of the gas lock. The particles may of course also be recirculated into the reactor chamber by mechanical means, such as a screw feeder.

Fluidizing air introduced into the combustor, for control of heat transfer or for transporting particles into the particle chamber, may also be used as secondary air in the combustion chamber. The particle outlet openings or the particle inlet openings allow gas to flow outward through the upper end wall countercurrently to the particle flow. The particle flow inward into the particle chamber is unstable and does not prevent gases from escaping from the chamber.

In a circulating fluidized bed reactor bed material is discharged with the exhaust gases and separated from the gases in a particle separator. The particles are there-after reintroduced through a particle inlet into the reactor chamber, usually into the lower part of the reactor chamber. When utilizing a particle chamber according to the present invention in a circulating fluidized bed reactor, this externally circulated bed material may be wholly or partly reintroduced into the reactor through that particle chamber. An inlet for externally circulated material is then provided in the particle chamber. If heat transfer surfaces are to be provided in the particle chamber, then heat is recovered from both externally and internally circulating material.

The present invention provides an improved method and apparatus for processing solid particles within the internal circulation of a reactor chamber. The present invention especially provides an improved method for concentrating large amounts of particles and recovering heat from those particles without having to circulate the particles externally and without large objects causing problems. The present invention further allows a simple and stiff evaporator construction to be used.

Further features and advantages of the present invention will be more fully appreciated by reference to the following detailed description of the drawings, and from the appended claims.

DETAILED DESCRIPTION OF THE DRAWINGS

Figure 1:
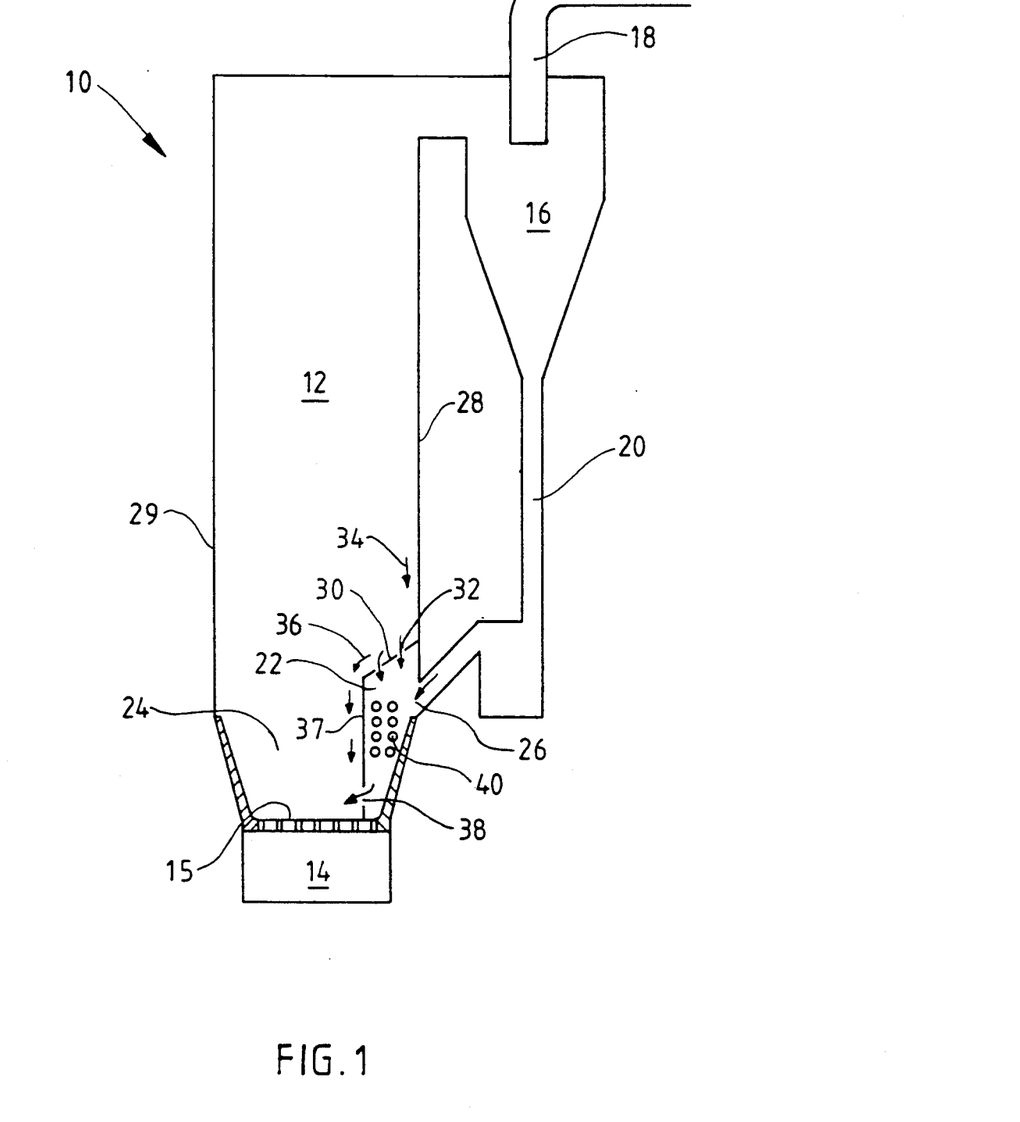
FIG. 1 is a schematic vertical cross sectional view of a circulating fluidized bed reactor constructed in accordance with a first preferred exemplary embodiment of the present invention.

FIG. 1 shows a circulating fluidized bed reactor 10 having a reactor chamber 12, a conventional windbox 14 with grid 15 for introducing fluidizing air into the reactor chamber, a conventional particle separator 16, a conventional gas outlet 18 and a conventional return duct 20 for recycling solid particles into the reactor chamber 12.

A particle chamber 22 according to the present invention is disposed in the lower part 24 of the reactor chamber 12. According to this embodiment the particle chamber 12 is provided in connection with an inlet 26 for particles being recycled through the return duct 20. In this way, relatively fine material discharged from the reactor 10 entrained in the flue gases is introduced into the particle chamber 22. There may be several inlets for particles being recycled and a particle chamber 22 may be connected to each of the inlets, or only to one, or some, of them.

Additionally particles flowing downwardly along a side wall 28 of chamber 12 are captured by a barrier wall 30 forming the roof of the particle chamber 22. Openings 32 in barrier wall 30 allow fine solid particles (see arrows 34) to flow through the barrier wall 30. Larger objects (see arrows 36) flow downwardly on the outside surface 37 of the particle chamber 22. The particles entering inlet 26 and openings 32 are reintroduced into the lower part of the reactor chamber through opening 38.

The opening 38 for reintroducing particles into the reactor chamber may constitute a gas lock, if necessary. The opening 38 may, e.g., be formed by narrow slots disposed on top of the other, with each slot forming an L-valve.

Heat transfer surfaces 40 are disposed in the particle chamber 22. The heat transfer surfaces 40 may e.g. be evaporator or superheater surfaces. By recovering heat from particles circulating internally in the reactor chamber 12 it is possible to generate substantial amounts of heat even at low loads.

Figure 2:
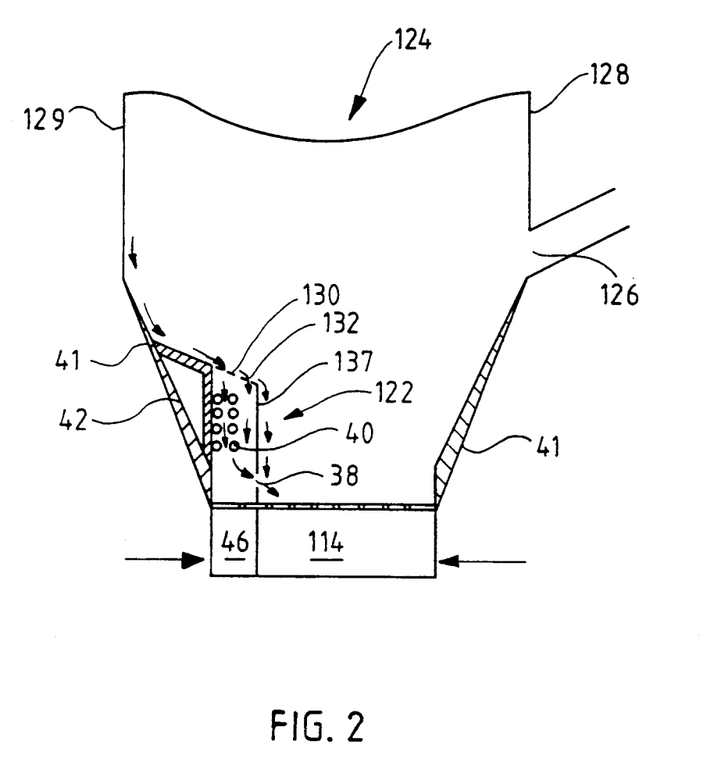
FIGS. 2 and 3 are schematic enlarged cross sectional views of the lower part of a fluidized bed reactor chamber according to other exemplary embodiments of the present invention.

FIG. 2 shows an enlarged view of the lower part 124 of another embodiment of reactor chamber according to the invention. In this embodiment components comparable to those in FIG. 1 are shown by the same reference numerals only preceded by a "1". According to this embodiment, particle chamber 122 is disposed adjacent a side wall 129 opposite to side wall 128 having the inlet 126 for recycled fine solid particles. The particle chamber 122 is disposed in the lowermost part 124 of the reactor chamber, which has inclined refractory lined walls 41. A portion 42 of the refractory lined wall 41 adjacent side wall 129 forms a side wall of the fine material chamber 122 as well. Also the barrier wall 130 and side wall 137 of chamber 122 are preferably refractory lined. The barrier wall 130 and the side wall 137 form a partition between the bottom 124 of the reactor chamber, and the particle chamber 122.

In a circulating fluidized bed reactor a dense flow of particles moves downwardly along the lowermost side walls 41 and a substantial portion of particles can be recycled through the particle chamber 122. Heat transfer surfaces 140 are preferably disposed in the particle chamber 122. Heat transfer may be controlled by controlling the flow of fluidizing air from windbox 46. Also reintroduction of particles through opening 138 into the reactor chamber 112 may be controlled by controlling the flow of fluidizing air in the vicinity of the opening 138.

Figure 3:
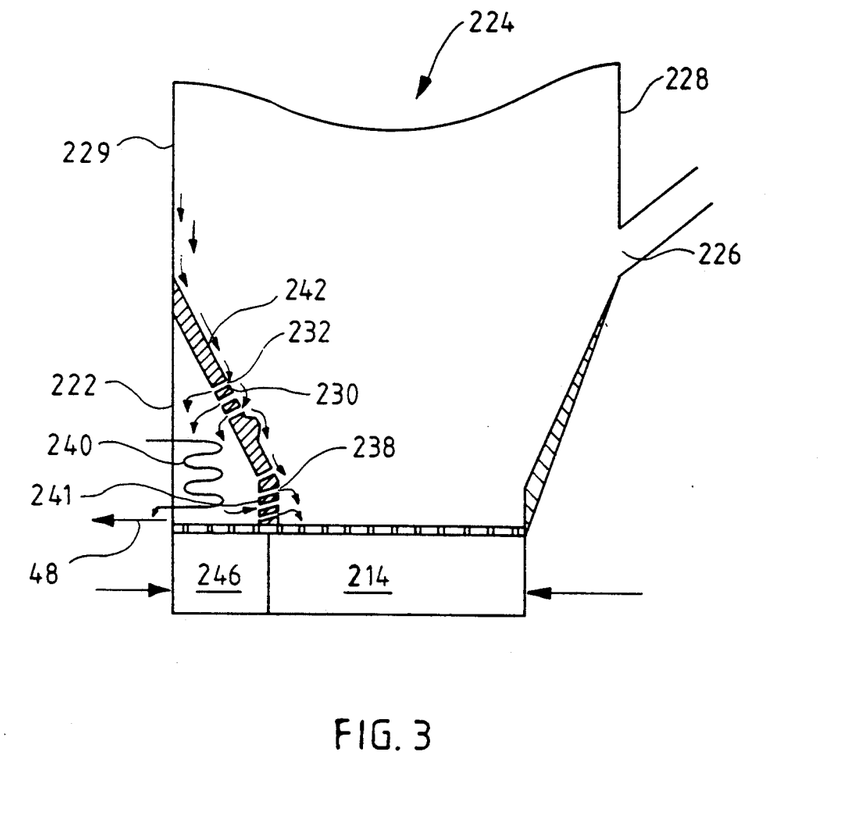

FIG. 3 illustrates a further embodiment of the present invention. In this embodiment components comparable to those in FIG. 2 are shown by the same two digit reference numeral only preceded by a "2". In this embodiment the particle chamber is provided as a portion of the inclined refractory lined wall element 242 of the lower reactor chamber 224. Inlet openings 232, having a predetermined diameter or width are provided in the upper part of the refractory lined side wall portion 242, this upper part thereby forming a barrier wall 230. Outlet openings 238 are provided in the lowermost part of the refractory lined side wall 241 for reintroducing particles into the reactor chamber. Solid particles flow into the particle chamber 222 through openings 232 and are recycled into the reactor chamber through openings 238. Some particles may be discharged from chamber 222 through an outlet 48 if desired.

Figure 4:
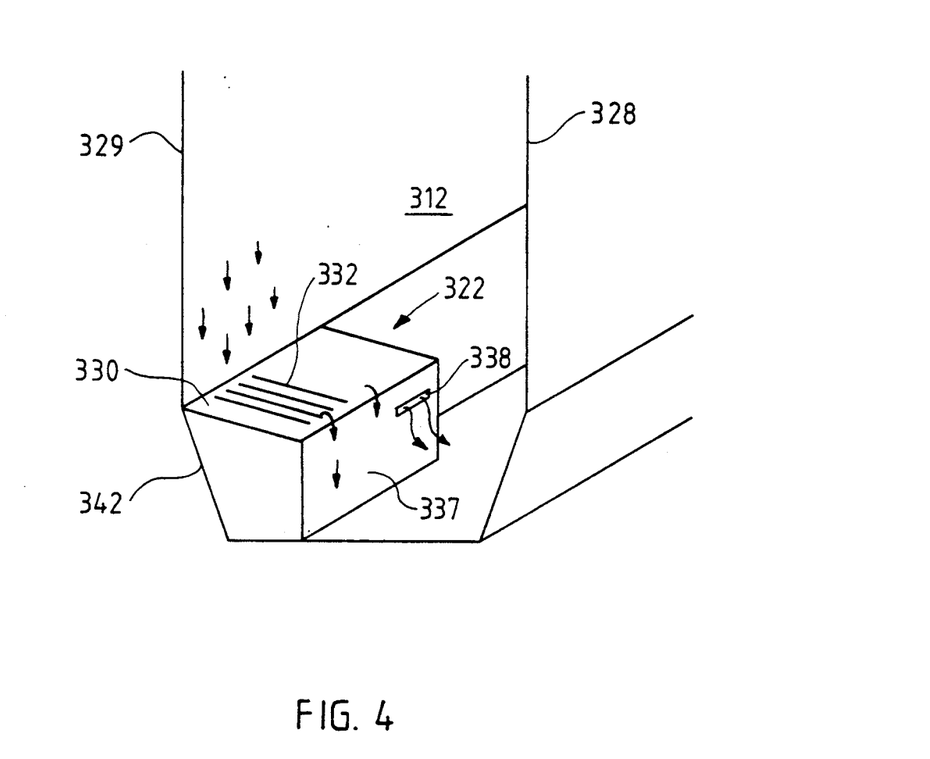
FIG. 4 is a schematic isometric view of the lower part of a fluidized bed reactor chamber according to still another exemplary embodiment of the present invention.

FIG. 4 shows an isometric view of still another embodiment according to the present invention. In this embodiment components comparable to those in FIG. 3 are shown by the same two digit reference numeral only preceded by a "3". In this embodiment the inlet openings 332 and outlet openings 338 are in opposite parts of the particle chamber 322 for providing good mixing of the material therein. The outlet opening 338 allows solid particles to flow from the particle chamber 322 into the reactor chamber 312. The particle level in the particle chamber 322 is dependent on the location of the outlet opening 338 in wall 337.

Figure 5:
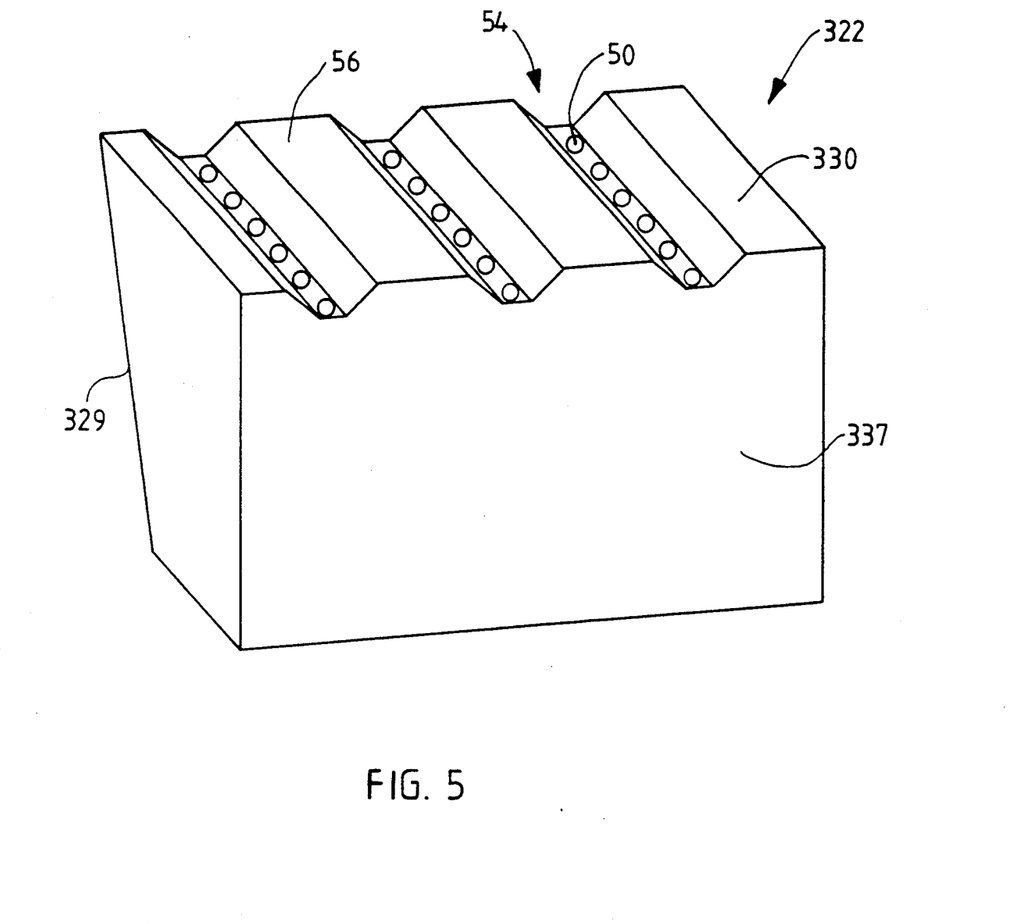
FIGS. 5 and 6 are schematic enlarged views of the barrier walls in particle chambers according to other further embodiments of the present invention.
Figure 6:
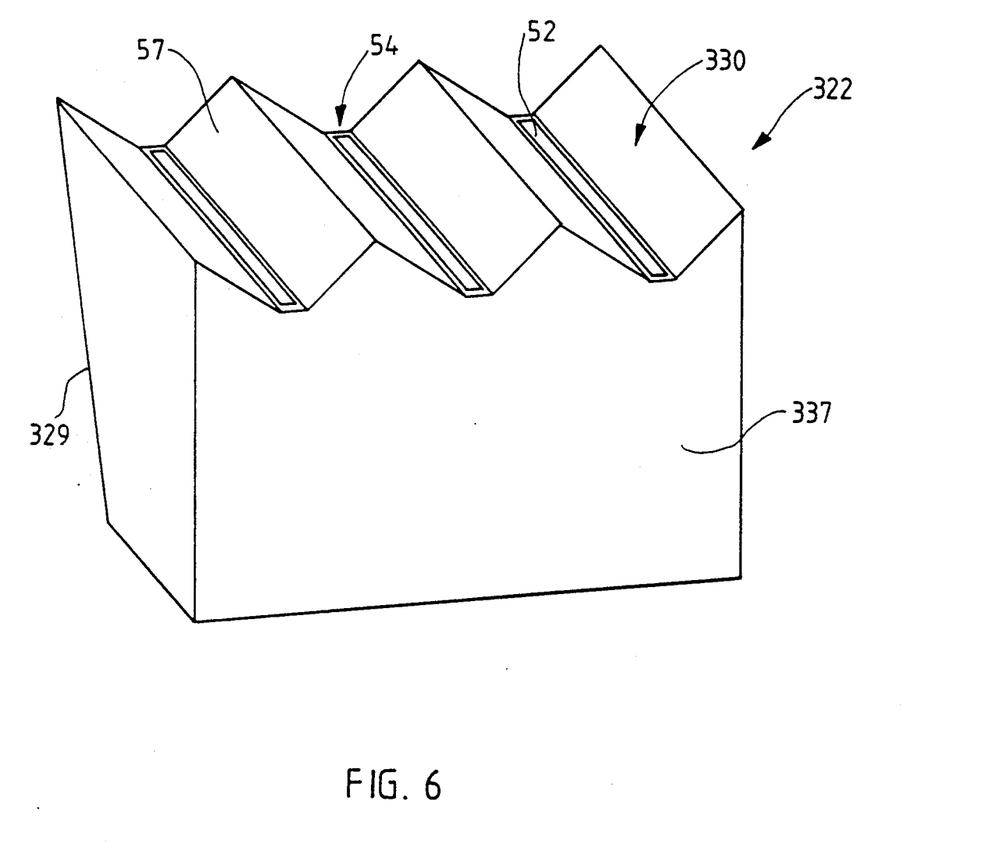

FIGS. 5 and 6 show enlarged views of the barrier wall 330 of the reactor of FIG. 4. The barrier wall holes 50 in FIG. 5 and slots 52 in FIG. 6 are made in furrows 54 in the refractory layer 56 covering the side walls 337 and the roof 330 of the particle chamber 332.

The particle chamber 322 walls may be made of tube panels i.e. water or evaporator tubes connected by fins. The furrows 54 in the embodiment shown in FIGS. 5 and 6 are made so as to expose the fins between the water or evaporator tubes. Openings 50 or slots 52 are formed in the fins.

In the embodiment shown in FIG. 6, the barrier wall 330 has ridgelike inclined surfaces 57 between the furrows 54 without any noticeable horizontal plane. Thus all particles flowing down onto the barrier wall 330 are guided towards the slots 52 in the bottom of the furrows 54. Particles are gathered from a cross sectional area which is much greater than the cross sectional area of the slots 52. Particles are gathered from a cross sectional area at least twice the area of the slots. The ridges 57 make it possible to gather and classify particles from a large area without having to increase the size or amount of slots 52.

In other embodiments of the invention, portions of the upper wall (30, 130, etc.) of the particle chamber (22, 122, etc.) may also form guide walls guiding particles towards the opening or slots.

Figure 7:
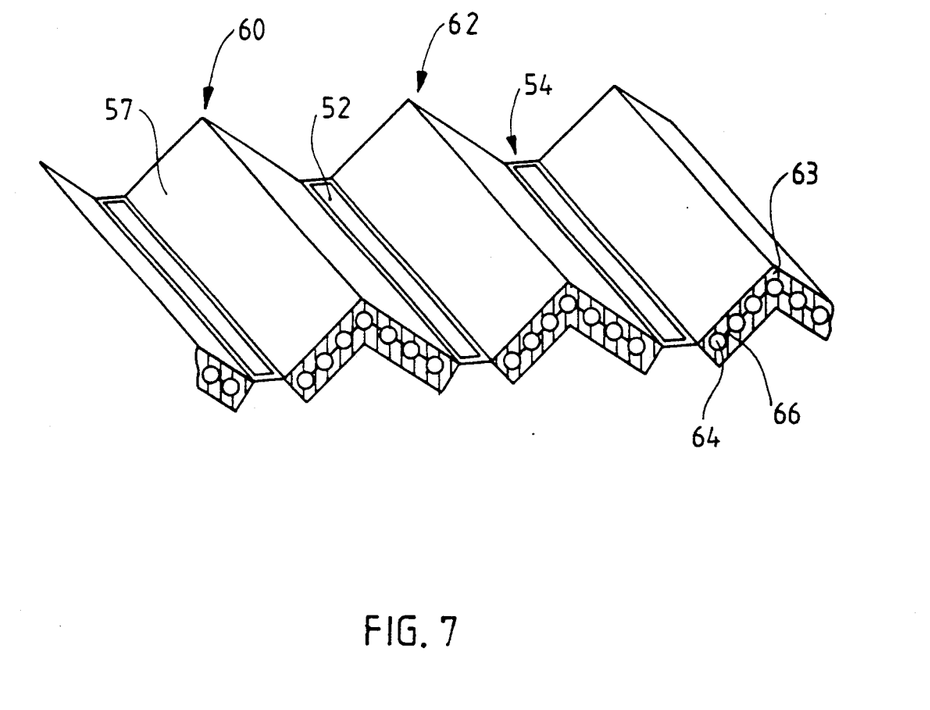
FIG. 7 is a perspective view, partly in cross section, of the barrier wall in FIG. 6.

FIG. 7 is a partly cross sectional view of the ridgelike elements 57 of the barrier wall 330 of FIG. 6. The ridgelike elements 57 are made of tubeplate V-form sections 60, 62 covered with refractory 63. The tubeplate is made of tubes 64 connected by fins 66. The tubeplate sections are disposed parallel to each other, leaving a slot 52 between two adjacent sections 60, 62.

The area of the upper gathering wall (i.e. 30, 130, 230, 330) of the particle chamber (i.e. 22, 122, 222, 322) in each embodiment has a horizontal projection area A. The inlet openings (i.e. 32, 132, 232, 50, 52) on the other hand have a total open area B which is less than half of the area A.

It will thus be seen that according to the present invention an apparatus and method have been provided which provide enhanced collection and classification of internally circulated particles in a fluidized bed reactor.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. In a method for circulating solid material in a fluidized bed reactor, including a rector chamber, having side walls defining the interior of the reactor chamber and a grid at the bottom of the reactor chamber, a gas discharge opening adjacent the upper end of the reactor chamber, the fluidized bed having an internal circulation of solid particles; said improvement comprising the steps of:
    (a) gathering solid particles from the internal circulation of solid particles into a particle chamber, the particle chamber having an upper end wall with inlet openings allowing particles to flow into the particle chamber;
    (b) causing particles having a horizontal cross sectional area A to flow in the internal circulation of solid particles toward the upper end wall;
    (c) causing particles from the flow of particles to flow into the particle chamber through the inlet openings in the upper end wall, the inlet openings having a total open area B, significantly smaller than the cross sectional area A; and
    (d) recirculating at least a portion of the particles thus introduced into the particle chamber into the reactor chamber.

2. A method according to claim 1 wherein the cross sectional area A is more than twice the total open area B of the inlet openings.

3. A method according to claim 1 wherein step (c) is practiced by allowing only particles of a size smaller than a predetermined size to flow from the fluidized bed through an end wall, which forms at least a part of a gathering wall, into the particle chamber.

4. A method according to claim 1 comprising the further step of recovering heat from the particles in the particle chamber utilizing heat transfer surfaces disposed in the particle chamber.

5. A method according to claim 3 wherein step (c) is practiced for downwardly flowing particles.

6. A method according to claim 3 wherein step (c) is practiced by allowing substantially only round solid particles having a diameter smaller than about 30 mm to flow into the particle chamber.

7. A method according to claim 3 wherein step (c) is practiced by allowing substantially only oblong solid particles having a width smaller than about 30 mm to flow into the particle chamber.

8. A method according to claim 1, wherein step (d) is practiced by overflow through openings provided in a wall of the particle chamber.

9. A method according to claim 4, wherein step (d) is practiced by introducing particles into the particle chamber at one end thereof and recirculating particles from an opposite end thereof into the reactor chamber, to provide a suitable residence time for the particles and good mixing thereof in the particle chamber before the practice of step (d), to provide optimized heat recovery in the particle chamber.

10. A method according to claim 1, comprising the further step of circulating particles externally of a circulating fluidized bed reactor, and reintroducing externally circulating particles into the reactor chamber through the particle chamber.

* * * * *